United States Patent
Kaster et al.

(10) Patent No.: US 8,775,046 B2
(45) Date of Patent: Jul. 8, 2014

(54) UNINTENDED ACCELERATION DETECTION AND CORRECTION

(75) Inventors: Robert M. Kaster, White Lake, MI (US); Francis Henry Kasperski, III, Brighton, MI (US); Carlos H. Atoche, West Bloomfield, MI (US); Hideo Takada, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 13/223,370

(22) Filed: Sep. 1, 2011

(65) Prior Publication Data

US 2013/0060442 A1    Mar. 7, 2013

(51) Int. Cl.
- *B60T 8/34* (2006.01)
- *B60T 8/44* (2006.01)
- *B60T 8/32* (2006.01)
- *B60T 8/88* (2006.01)

(52) U.S. Cl.
USPC ......... 701/70; 701/69; 303/113.1; 303/114.3; 303/121; 303/122

(58) Field of Classification Search
CPC ..... B60K 28/10; B60T 13/662; B60W 10/06; B60W 10/18; B60W 2050/143; B60W 2510/182; B60W 2520/10
USPC ......... 701/69, 70; 303/113.1, 114.3, 121, 122
See application file for complete search history.

(56) References Cited

U.S. PATENT DOCUMENTS

| | | | |
|---|---|---|---|
| 4,632,079 A | 12/1986 | Panizza et al. | |
| 4,866,712 A * | 9/1989 | Chao | 714/704 |
| 4,942,784 A | 7/1990 | Okahara | |
| 4,962,835 A | 10/1990 | Pruss | |
| 5,193,640 A | 3/1993 | Lee | |
| 5,902,210 A | 5/1999 | Kobayashi et al. | |
| 6,305,757 B1 * | 10/2001 | Ohsaki et al. | 303/114.3 |
| 6,311,116 B1 | 10/2001 | Lee | |
| 6,919,801 B2 | 7/2005 | Kim | |

(Continued)

FOREIGN PATENT DOCUMENTS

| | | |
|---|---|---|
| CN | 101332809 | 12/2008 |
| KR | 20110076260 | 7/2011 |
| WO | 2006107301 | 10/2006 |

OTHER PUBLICATIONS

Kang D-C., et al., "A Development of the System to Prevent Unintended Sudden Acceleration by Controlling the Transmission of a Vehicle," IEEE Publication, Oct. 2006; 14-15.

(Continued)

*Primary Examiner* — Fadey Jabr
*Assistant Examiner* — Thomas Ingram
(74) *Attorney, Agent, or Firm* — Michael Best Friedrich LLP (57) ABSTRACT

Systems and methods for detecting unintended acceleration of a vehicle. One system includes a first sensor that provides information on a brake booster vacuum. The vacuum is provided by the vehicle's engine and the brake booster multiplies a braking force initiated by a driver. A second sensor provides information on the vehicle's speed, and a third sensor provides information on the braking force initiated by the driver. The system also includes a controller configured to receive the information from the first sensor, second sensor, and third sensor and initiate corrective action if the brake booster vacuum is less than a predetermined threshold, the vehicle's speed is greater than a predetermined threshold, and the braking force initiated by the driver is greater than a predetermined threshold.

25 Claims, 9 Drawing Sheets

(56) References Cited

U.S. PATENT DOCUMENTS

| | | |
|---|---|---|
| 7,254,472 B2 | 8/2007 | Larsen et al. |
| 2002/0101113 A1* | 8/2002 | Tracht et al. ............... 303/113.1 |
| 2003/0222499 A1* | 12/2003 | Ely et al. ...................... 307/10.1 |
| 2007/0034440 A1 | 2/2007 | Zomotor |
| 2007/0142169 A1* | 6/2007 | Marcil .......................... 477/107 |
| 2007/0299575 A1* | 12/2007 | Yamada et al. ................. 701/29 |
| 2009/0099745 A1* | 4/2009 | Karnjate et al. ................ 701/70 |
| 2009/0127015 A1 | 5/2009 | Van Saanen |
| 2009/0145673 A1 | 6/2009 | Soliman et al. |
| 2009/0319118 A1* | 12/2009 | Knechtges ...................... 701/31 |
| 2010/0138123 A1* | 6/2010 | Tokimasa et al. ............... 701/70 |

OTHER PUBLICATIONS

International Search Report and Written Opinion for Application No. PCT/US2012/053366 dated Nov. 21, 2012 (7 pages).

* cited by examiner

UNINTENDED ACCELERATION DETECTION AND CORRECTION

Embodiments of the present invention relate to methods and systems for detecting and correcting for unintended acceleration of a vehicle.

SUMMARY

Vehicles can experience unintended acceleration in various situations. For example, sticking acceleration pedals caused by misplaced floor mats or other objects or a mechanical, electrical, or software malfunction can cause unintended acceleration. In some embodiments, even if the vehicle driver activates the brakes fully and quickly, there is insufficient deceleration force to overcome the unintended acceleration and the vehicle can travel dangerously out of control.

Embodiments of the invention provide detection systems and methods that identify unintended acceleration and react accordingly. The systems and methods monitor various operating parameters of a vehicle, such as brake pressure, brake booster vacuum, engine output torque, vehicle speed, etc., to detect unintended acceleration. When unintended acceleration is detected, the systems and methods take various actions to counteract the unintended acceleration. For example, the systems and methods can determine if the vehicle can be adequately decelerated using brake force. If not, the systems and methods can instruct the engine to reduce or eliminate its output torque to provide an additional deceleration force to overcome the unintended acceleration. In some embodiments, the detection methods and systems are combined with existing vehicle control systems, such as an electronic stability control ("ESC") system.

In one construction, the invention provides a system for detecting unintended acceleration of a vehicle. The system includes a first sensor that provides information on a brake booster vacuum. The vacuum is provided by the vehicle's engine and the brake booster multiplies a braking force initiated by a driver. A second sensor provides information on the vehicle's speed, and a third sensor provides information on the braking force initiated by the driver. The system also includes a controller configured to receive the information from the first sensor, second sensor, and third sensor and initiate corrective action if the brake booster vacuum is less than a predetermined threshold, the vehicle's speed is greater than a predetermined threshold, and the braking force initiated by the driver is greater than a predetermined threshold.

In another construction, the invention provides a computer-implemented method for detecting unintended acceleration of a vehicle. The method includes receiving, at a controller, information on a brake booster vacuum provided by the vehicle's engine to multiply a braking force initiated by a driver. The controller also receives information on the vehicle's speed and information on the braking force initiated by the driver. The method also includes initiating, at the controller, corrective action if the brake booster vacuum is less than a predetermined threshold, the vehicle's speed is greater than a predetermined threshold, and the braking force initiated by the driver is greater than a predetermined threshold.

In yet another construction, the invention provides non-transitory computer-readable medium including executable instructions for detecting unintended acceleration of a vehicle. The medium includes instructions for receiving information on a brake booster vacuum provided by the vehicle's engine to multiply a braking force initiated by a driver, information on the vehicle's speed, and information on the braking force initiated by the driver. The medium also includes instructions for initiating corrective action if the brake booster vacuum is less than a predetermined threshold, the vehicle's speed is greater than a predetermined threshold, and the braking force initiated by the driver is greater than a predetermined threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
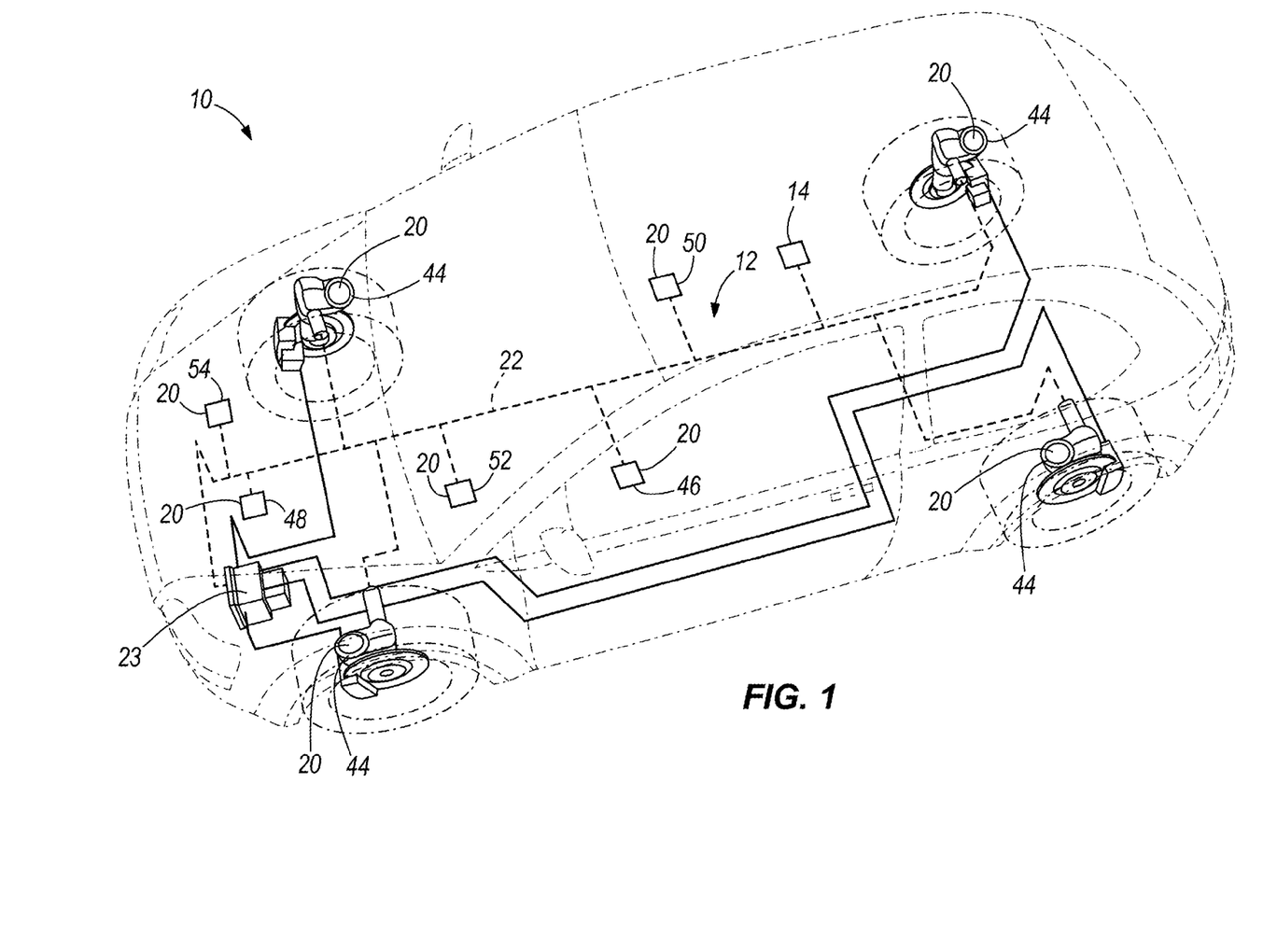
FIG. 1 illustrates a vehicle including an unintended acceleration detection system.

FIG. 1 illustrates a vehicle 10. The vehicle 10 includes an unintended acceleration detection system 12. The system 12 includes a controller 14 and a plurality of different types of sensors. In FIG. 1, each sensor is labeled with the reference numeral 20 as well as a second reference numeral. The second reference numerals, which are described in more detail below, provide a specific label to differentiate various types of sensors from one another. The sensors 20 are connected to a network, such as a controller area network ("CAN") bus 22. The sensors 20 provide information regarding the operating parameters of the vehicle.

Figure 2:
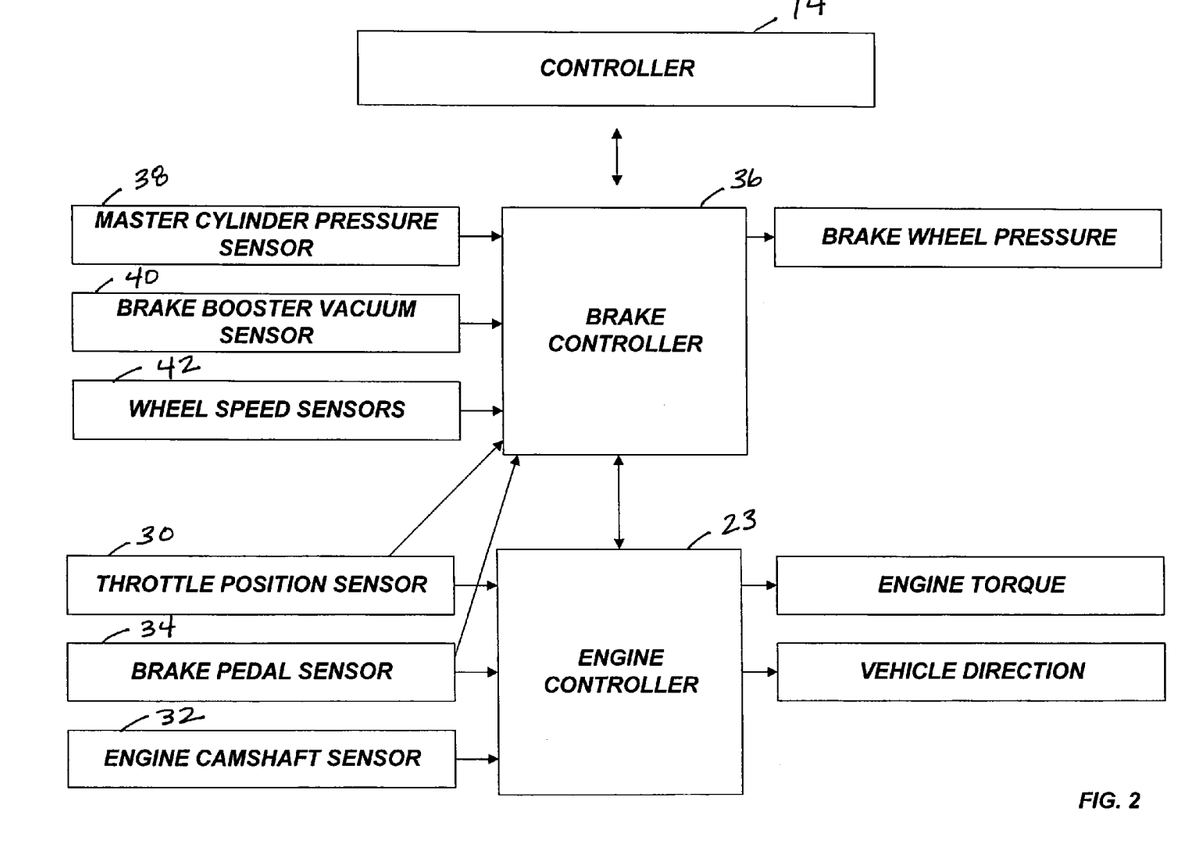
FIGS. 2 and 3 schematically illustrate the unintended acceleration detection system of FIG. 1.

The sensors 20 can include one or more controllers. For example, as shown in FIG. 2, the controller 14 can receive information from an engine controller 23. The engine controller 23 transmits signals on the CAN bus 22 (or a separate connection) representing a current state of the vehicle's engine. For example, the engine controller 23 can provide signals representing a throttle position (which correlates to how the driver presses on the accelerator pedal), a camshaft speed (which correlates to how fast the engine camshaft is turning), a brake pedal status (which correlates to whether the driver is stepping on the brake pedal), an engine torque (which correlates to how much the vehicle is accelerating), and/or a vehicle direction (which correlates to whether the vehicle is moving forward or in reverse). A throttle position sensor 30, an engine camshaft sensor 32, and a brake pedal sensor 34 can transmit signals representing the current state of the vehicle's engine to the engine controller 23 and/or over the CAN bus 22. In some embodiments, the controller 14 obtains the information and signals directly from the sensors 20 to by-pass any software, hardware, or other bugs or malfunctions present in the engine controller 23. The controller 14 can also obtain the signals from both the engine controller 23 and the individual sensors 30, 32, and 34 to confirm the existence of unintended acceleration (e.g., by comparing the signals to other signals the controller 14 obtained directly or derived) and/or for detecting malfunctions or bugs in the engine controller 23.

Figure 3:
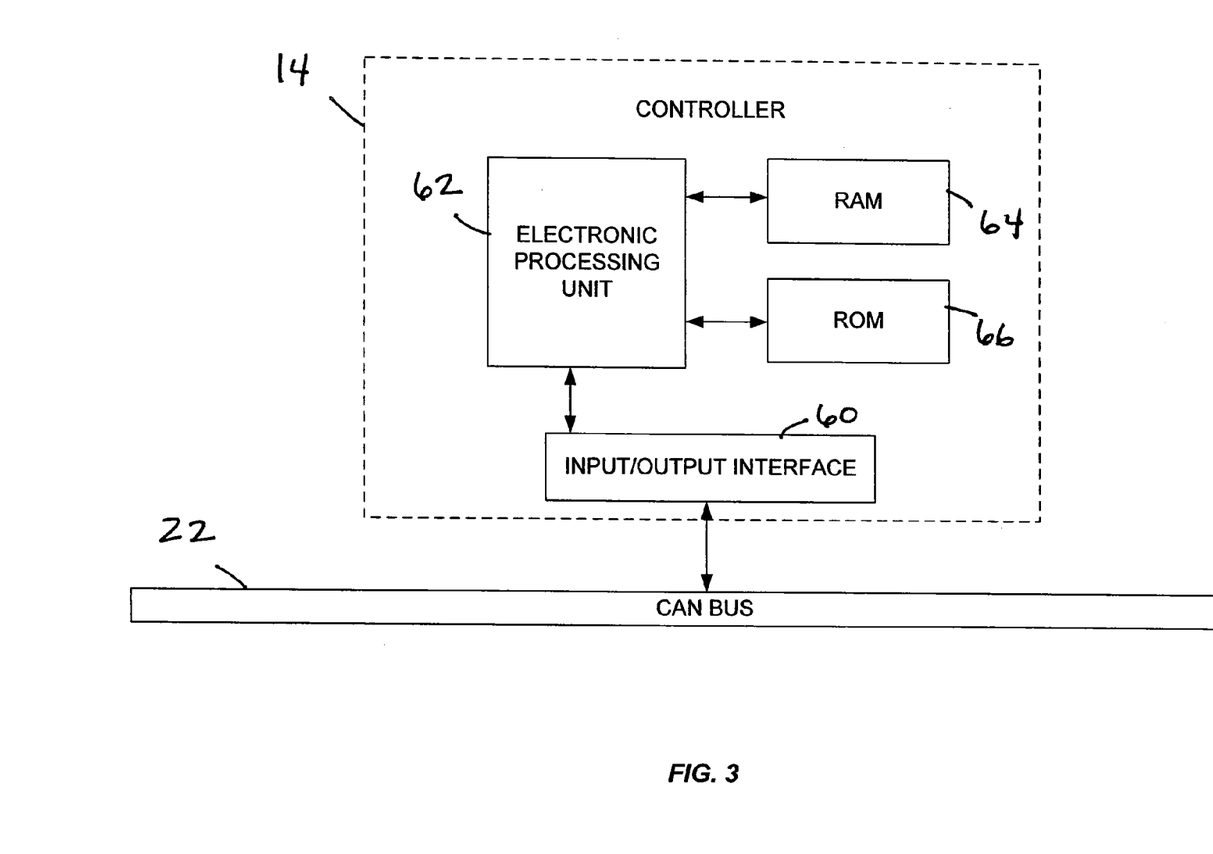

Similarly, as shown in FIG. 2, the controller 14 can receive information from a brake controller 36. The brake controller 36 transmits signals on the CAN bus 22 (or a separate connection) representing a current state of the vehicle's braking system. For example, the brake controller 36 can provide signals representing a master cylinder pressure, a brake booster vacuum, a wheel brake pressure, and a wheel speed. The master cylinder pressure signal indicates how hard the driver is pressing on the brake pedal and the wheel brake pressure signals indicate how much a particular vehicle wheel is being braked. The brake booster vacuum signal is associated with the vehicle's brake booster and indicates how much power-assist is available from the vacuum for the vehicle's braking system. In particular, the brake booster uses a vacuum created by the vehicle's engine to multiply a braking force initiated by a driver through a brake pedal that is applied to a master cylinder of the vehicle's braking system. As described below in more detail, high engine throttle generates little vacuum. The wheel speed signals indicate how fast a particular vehicle wheel is rotating and in what direction. As shown in FIG. 3, the brake controller 36 obtains these signals from a master cylinder pressure sensor 38, a brake booster vacuum sensor 40, and wheel speed sensors 44. The controller 14 can obtain these signals directly from the sensors 38, 40, and 44 to bypass any malfunctions or bugs present in the brake controller 36. Also, the controller 14 can obtain signals from both the brake controller 36 and the individual sensors 38, 40, and 44 to confirm the existence of unintended acceleration (e.g., by comparing the signals to other signals the controller 14 obtained directly or derived) and/or for detecting malfunctions or bugs in the brake controller 36.

As shown in FIG. 2, in some embodiments, the brake controller 36 also obtains signals from the throttle position sensor 30 and/or the brake pedal sensor 34, which the brake controller 36 can use as redundant inputs. It should be understood that the configuration illustrated in FIG. 2 is just one possible configuration and other configurations of sensors and controllers are possible.

Returning to FIG. 1, the sensors 20 can also include wheel speed sensors 44, a longitudinal acceleration sensor 46, one or more pressure sensors 48, a lateral acceleration sensor 50, a brake light switch 52, and a gearshift sensor or indicator 54. The pressure sensors 48 can include a brake pressure sensor for each wheel and a master cylinder pressure sensor. The pressure sensors 48 can also include a sensor associated with the vehicle's brake booster, which provides information about an amount of power-assist available to the vehicle's braking system.

FIG. 3 schematically illustrates the unintended acceleration detection system 12 in more detail. As shown in FIG. 3, the system 12 includes the controller 14, the one or more sensors 20, and the bus 22. In some embodiments, the controller 14 obtains sensor readings directly from one or more of the sensors 20 rather than over the bus 22. In some circumstances, the controller 14 uses compensated sensor readings rather than raw data. For example, the controller 14 can compensate one or more of the sensor readings by applying an offset. The controller 14 can use the offsets to compensate for sensor aging, fouling, and other signal corruption that may occur. Furthermore, it should be understood that in some embodiments other types of sensors 20 can be included in the system 12. Also, the controller 14 may only use information from a subset of the sensors 20 illustrated in FIGS. 1-3 to detect unintended acceleration. Furthermore, the arrangement and positions of the system components shown in FIGS. 1-3 is for illustrative purposes only.

As shown in FIG. 3, the controller 14 includes an input/output interface 60, an electronic processing unit ("EPU") 62, and one or more non-transitory memory modules, such as a random access memory ("RAM") 64 and read-only memory ("ROM") 66. The input/output interface 60 transmits and receives information over the bus 22, including sensor readings from the sensors 20. The input/output interface 60 can communicate with other components inside the vehicle (e.g., over the CAN 22) and outside of the vehicle. For example, the input/output interface 60 can include a network interface, such as an Ethernet card or a wireless network card, that allows the system 12 to send and receive information over a network, such as a local area network or the Internet.

The EPU 62 receives the information from the input/output interface 60 and processes the information by executing one or more instructions or modules. The instructions or modules are stored in non-transitory computer-readable medium, such as ROM 66. The EPU 62 stores information (e.g., information received from the bus 22 or information generated by instructions or modules executed by the EPU 62) to the RAM 64. It should be understood that although only a single EPU, RAM, ROM, and input/output interface are illustrated in FIG. 3, the controller 14 can include multiple processing units, memory modules, and/or input/output interfaces.

Although the engine controller 23 is illustrated in FIGS. 1-3 as a separate component from the controller 14, in some embodiments the controller 14 is combined with the engine controller 23. In other embodiments, the controller 14 is separate from the engine controller 23 to prevent faults (e.g., electrical, mechanical, or software-based) in the engine controller 23 from affecting the functionality provided by the controller 14. The controller 14 can also be combined with other vehicle controllers (e.g., the brake controller 36). For example, as noted above, in some embodiments, the controller 14 is included in an electronic stability control ("ESC") system. In particular, because an ESC system typically receives signals from the sensors 20 illustrated in FIGS. 1-3, combining the controller 14 with the ESC system decreases the number of independent controllers needed.

Figure 4A:
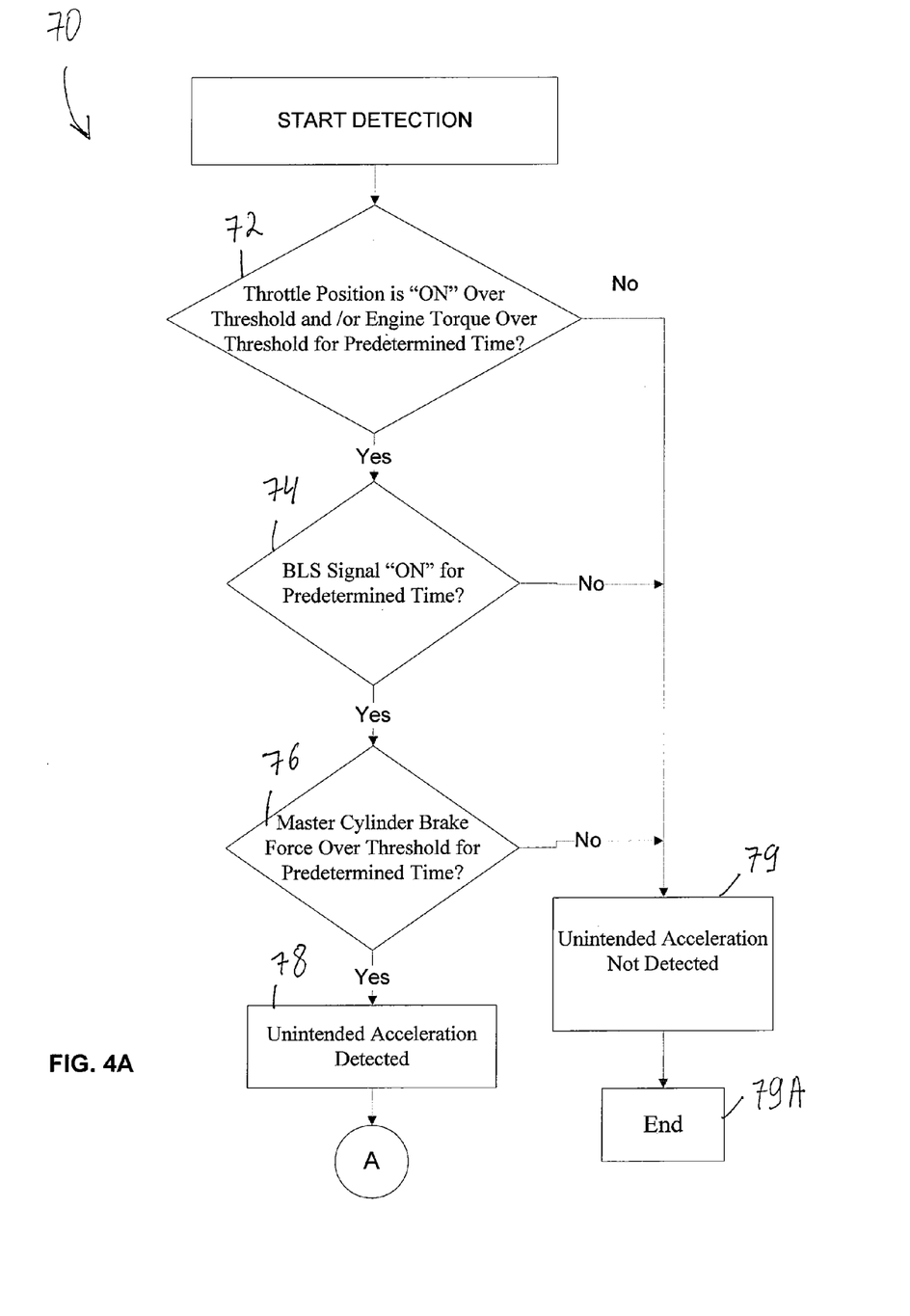
FIGS. 4A and 4B are a flow chart illustrating an unintended acceleration detection and correction method performed by the system of FIGS. 2 and 3.
Figure 4B:
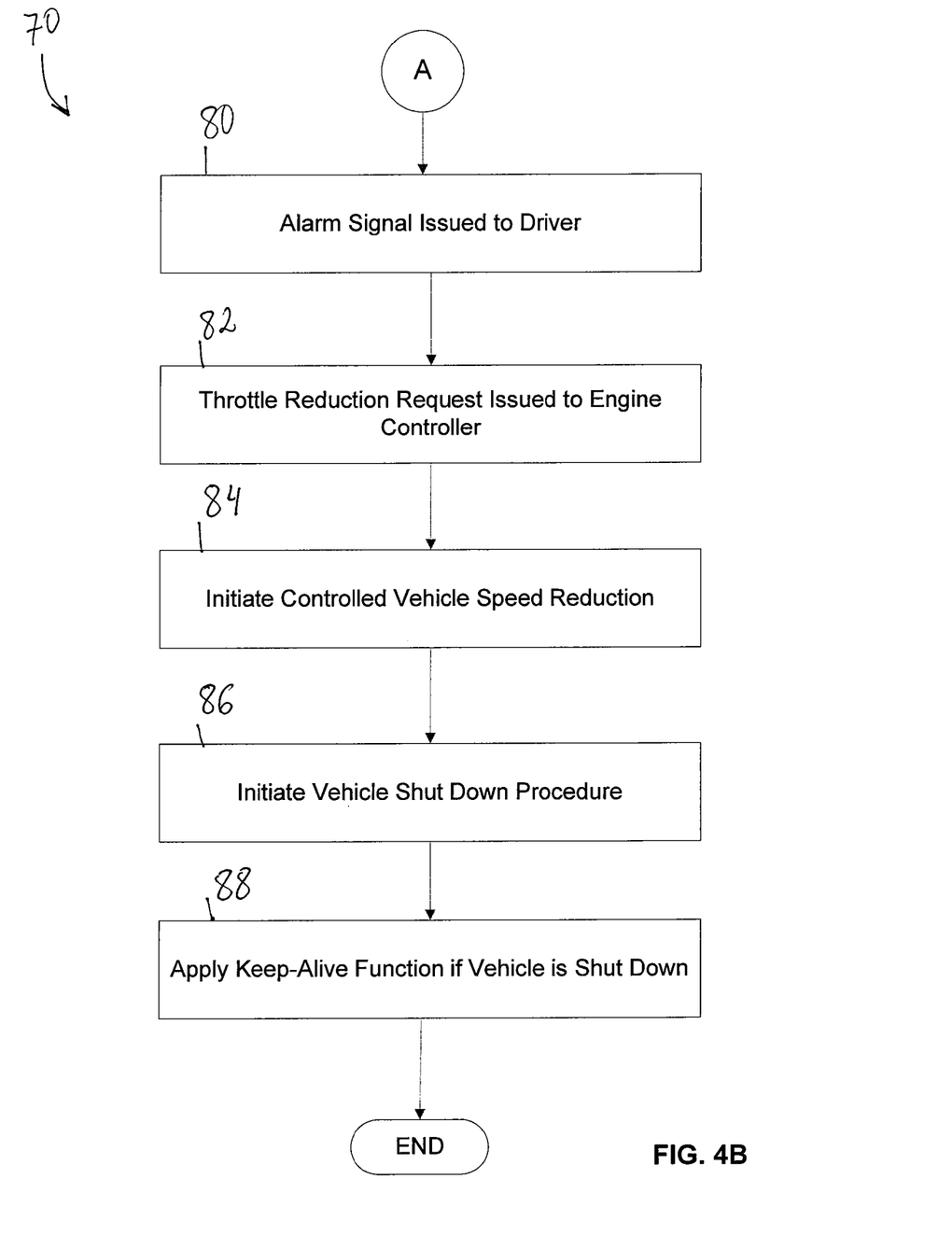

The instructions stored in the computer-readable media provide particular functionality when executed by the EPU 62. In general, the instructions provide one or more ways for the system 12 to detect and react to unintended acceleration. For example, FIGS. 4A and 4B are a flow chart illustrating an unintended acceleration detection and correction method 70 performed by the controller 14. As illustrated in FIG. 4A, to detect unintended acceleration (also called a vehicle race condition), the controller 14 monitors the throttle position of the vehicle's engine (at 72). As described above, the controller 14 can obtain the vehicle's current throttle position from the engine controller 23 over the CAN bus 22. Alternatively, the controller 14 can obtain the current throttle position directly from the throttle position sensor 30. In some embodiments, the throttle position can be set to "ON" or "OFF" and can be associated with a throttle position. The controller 14 checks (at 72) if the throttle position is set to "ON" and if the position is greater than a predetermined threshold (e.g., approximately 20%) for a predetermined time (e.g., approximately 2.0 seconds). As shown in FIG. 4A, the controller 14 can also monitor engine torque (at 72) in place of or in addition to monitoring throttle position. For example, the controller 14 can determine if the engine torque is greater than a predetermined threshold for a predetermined time.

Figure 5:
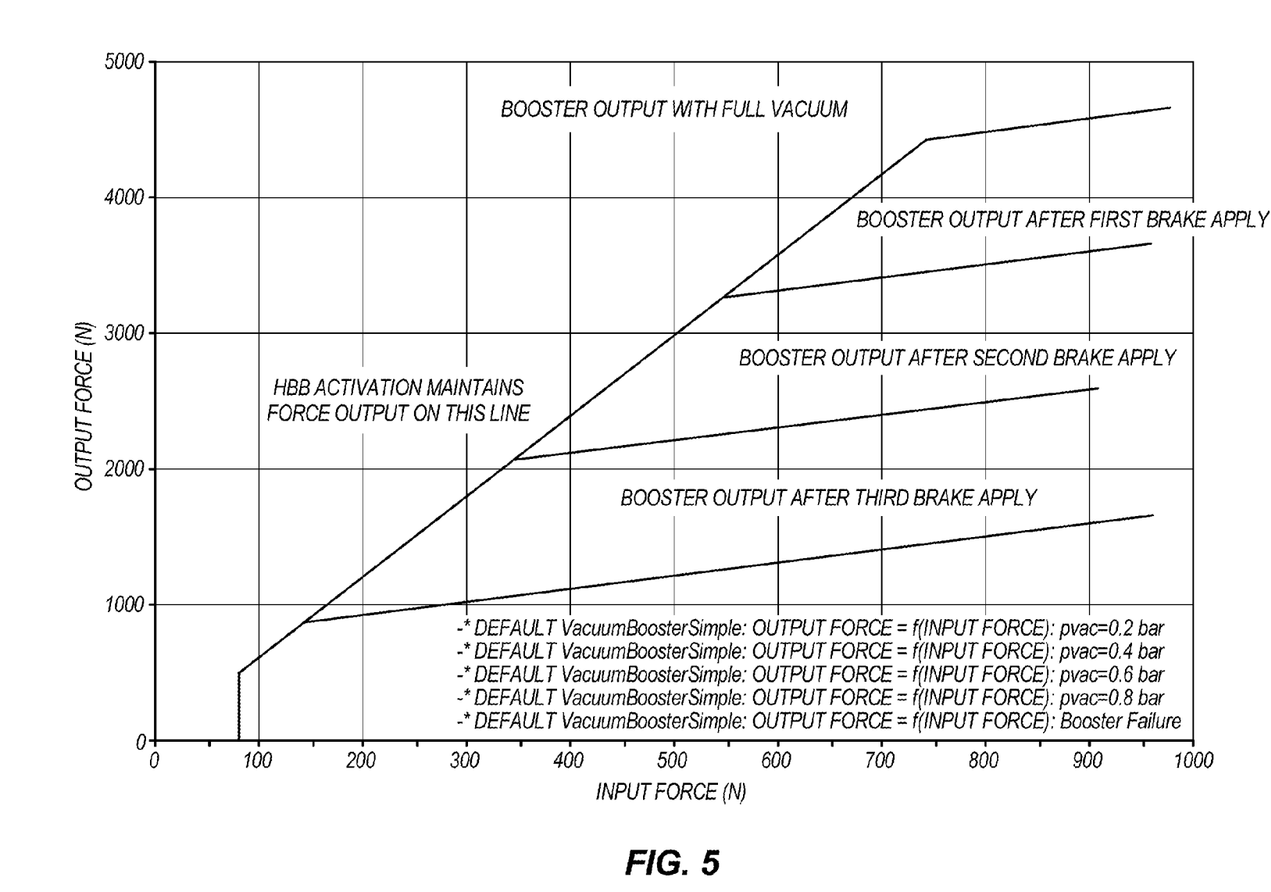
FIG. 5 includes a graph illustrating vacuum booster output.

In some embodiments, the controller 14 monitors engine throttle by monitoring the vehicle's brake booster (e.g., through the brake booster vacuum sensor 40). As described above, the brake booster uses a vacuum generated by the engine to multiply the force that a driver's foot applies to the brake pedal coupled to the master cylinder. For example, high engine throttle generates less of a vacuum for the brake booster than low engine throttle. As shown in FIG. 5, if the engine is operating at a wide open throttle, booster output decreases with each brake application. Therefore, because a driver will likely successively apply the race in a race condition ("pump the brakes"), the amount of brake booster output drops. Accordingly, the controller 14 can obtain a vacuum reading from the brake booster vacuum sensor (e.g., over the CAN bus 22) and can use this information to determine if there is high engine throttle (at 72). For example, if the brake booster vacuum is approximately −40 millibar for approximately 2.0 seconds or more, the controller 14 can conclude that there is high engine throttle. As described in more detail below, hydraulic brake boost ("HBB") functionality can be used to compensate for low brake booster vacuum and may be activated if the controller 14 detects unintended acceleration.

As shown in FIG. 4A, the controller 14 also monitors the BLS 52 (at 74). The BLS 52 is set to either "ON" or "OFF" and is set to "ON" when the driver applies the vehicle's brakes. As described above, the controller 14 obtains the current state of the BLS 52 over the CAN bus 22. The controller 14 checks if the BLS 52 is set to "ON" for a predetermined time (e.g., approximately 2.0 seconds) (at 74). It should be understood that the predetermined time for the BLS "ON" state can be the same or different than the predetermined time for the throttle "ON" state. Also, in some embodiments, the controller 14 can use information from the brake pedal sensor 34 to determine whether the driver is stepping on the brake pedal.

The controller 14 also monitors the master cylinder brake force or pressure (at 76). As described above, the pressure sensors 48 can monitor the pressure or brake force at each wheel and at the braking system's master cylinder. Therefore, the controller 14 can obtain the master cylinder brake pressure from one or more of the pressure sensors 48 over the CAN bus 22. As shown in FIG. 3, the controller 14 can also monitor the master cylinder brake pressure through the brake controller 36 and/or the master cylinder pressure sensor 38. In some embodiments, the master cylinder brake pressure can be defined as an increase of brake pressure over time. The controller 14 checks, if the master cylinder brake pressure is over a predetermined threshold (e.g., 80 barr) for a predetermined time (e.g., approximately 2.0 seconds) (at 76). Again, it should be understood that the predetermined time for the brake force can be the same or different than the predetermined time for the throttle "ON" state or the BLS "ON" state.

If all three of these conditions are met, the controller 14 assumes that an unintended acceleration condition exists (step 78) and the controller concludes that a race condition is occurring. Alternatively, all three conditions (steps 72, 74, and 76) are not met and an unintended acceleration condition does not exist (step 79). The controller 14 also concludes that a race condition is not occurring. In that situation, the controller 14 ends the unintended acceleration detection process (at 79A). However, the system repeats the process during the next cycle. Once the controller 14 detects the race condition, the controller 14 initiates one or more corrective actions to react to the unintended acceleration. For example, as illustrated in FIG. 4B, the controller 14 can issue an alarm or warning signal to the driver (at 80). The signal can be visual, audible, or a combination thereof.

The controller 14 can also initiate corrective action by issuing a signal to the engine controller 23 that includes a throttle reduction or kill request (at 82). The request specifies a reduction in engine torque (e.g., a specific reduction or a reduction to a specific level) or an engine kill command. The request overrides the unintended "accelerate" request issued to the engine controller 23 due to stuck acceleration pedal or a malfunction. When the engine controller 23 receives the throttle reduction or kill request, the engine controller 23 modifies operation of the vehicle's engine to reduce the engine's throttle a predetermined amount over a certain time or kill the vehicle's engine over a certain time.

As shown in FIG. 5, the controller 14 can also initiate corrective action by initiating a controlled vehicle speed reduction (at 84). The controlled vehicle speed reduction can be performed by the controller 14 and the ESC system to generate brake pressure and activate brake valves to direct brake pressure to one or more wheels as necessary to provide proper deceleration. As described above, in some embodiments, the vacuum used by the vehicle's brake booster can be monitored to detect a high engine throttle condition. In such a condition, there is little vacuum for the brake booster to use to increase braking force. Therefore, to apply sufficient braking force to overcome the unintended acceleration, a pump motor can be used to increase the vacuum available to the brake booster. This vacuum compensation process can be similar to the process used by HBB functionality.

The controller 14 (e.g., with the assistance of other vehicle control systems) can also initiate corrective action by initiating an engine shutdown procedure (at 86), which performs a controlled vehicle speed reduction through the engine controller 23. For example, the controller 14 can use the ESC system to generate brake pressure and activate brake valves to direct brake pressure to one or more of the vehicle's wheels (e.g., all four wheels) as necessary to stop the vehicle 10. The controller 14 can also generate a signal that includes a kill or shut-down signal and can transmit the signal to the engine controller 23. Upon receiving the kill or shut-down signal, the engine controller 23 can initiate a controlled vehicle speed reduction. In addition, if the vehicle's ESC system includes combined active passive safety integration (e.g., controlled deceleration systems and other sensors), the controller 14 generate one or more signals to interact with the vehicle's ESC system to detect high speed closure rates and assist with an engine shutdown procedure and initiate controlled vehicle deceleration.

If the driver shuts off the vehicle's ignition in an attempt to stop the unintended acceleration, the controller 14 can initiate corrective action by performing a keep-alive function that keeps the vehicle operating to bring the vehicle to a safe stop (at 88). In addition, the controller 14 can initiate corrective action by applying hydraulic brake boosting in order to apply sufficient braking force to overcome unintended acceleration until the vehicle has been stopped and can be turned off properly.

Figure 6A:
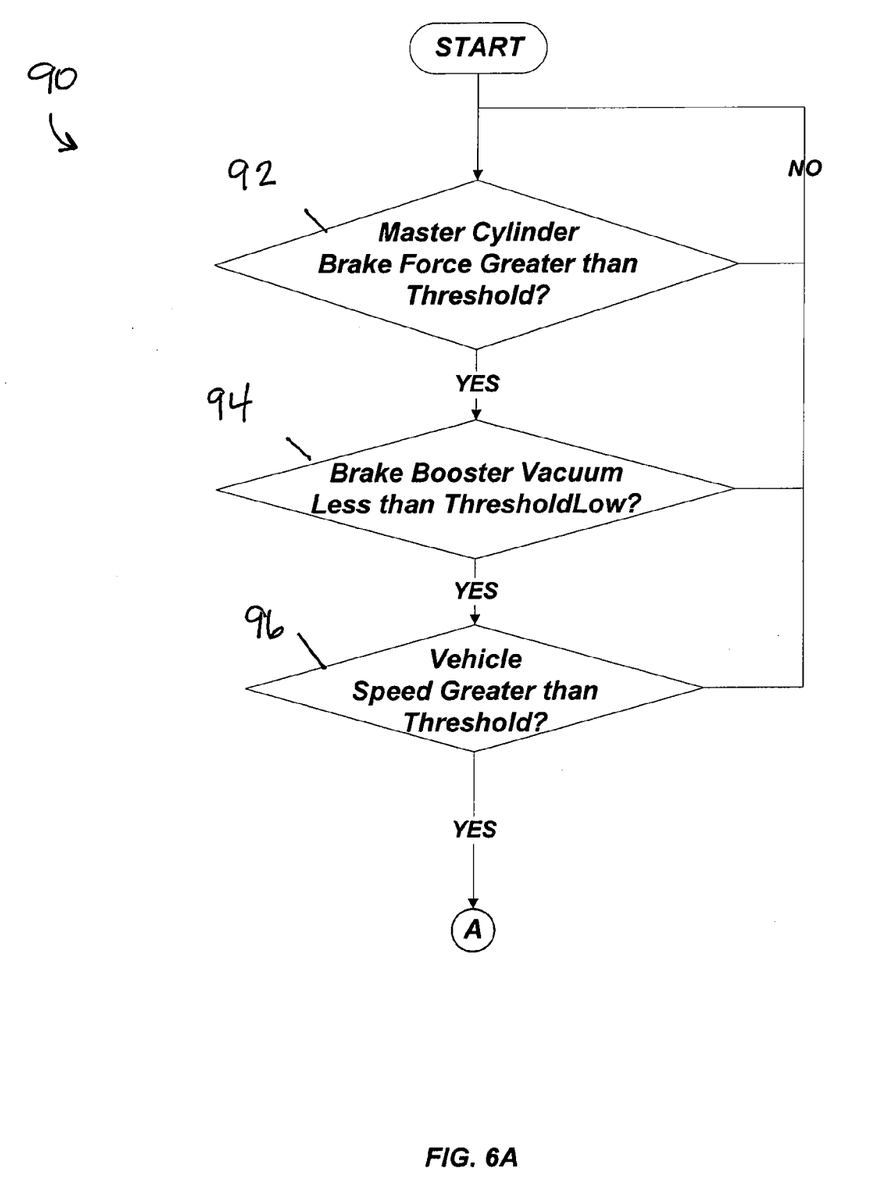
FIGS. 6A and 6B are a flow chart illustrating another unintended acceleration detection and correction method performed by the system of FIGS. 2 and 3.
Figure 6B:
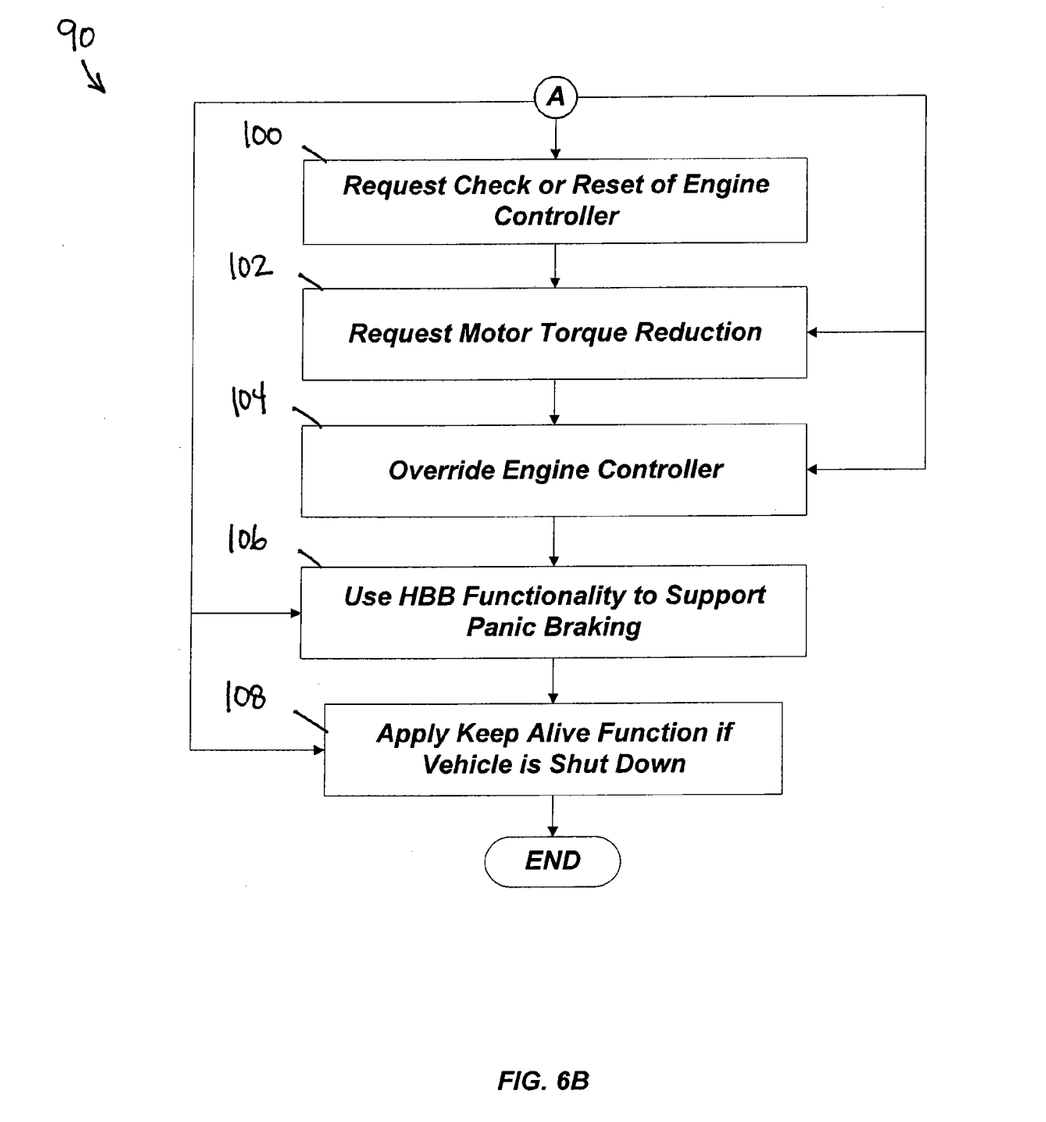

As noted above, unintended acceleration can be detected in numerous ways and various reactions can be taken to handle detected unintended acceleration. FIGS. 6A and 6B are a flow chart illustrating another unintended acceleration detection and correction method 90 performed by the controller 14. As illustrated in FIG. 6A, to detect unintended acceleration, the controller 14 monitors a braking pressure initiated by the driver and determines if the braking pressure is greater than a predetermined threshold. For example, in some embodiments, the controller 14 monitors the master cylinder pressure and detects when the master cylinder brake pressure is greater than a predetermined threshold (e.g., 80 barr) due to the driver stepping on the brake pedal (at 92). In some embodiments, the controller 14 obtains information on the master cylinder pressure from the master cylinder pressure sensor 38 and/or the brake controller 36. The controller 14 can compare the received signal to the predetermined threshold. In some embodiments, the controller 14 also determines whether the master cylinder brake pressure has been greater than the predetermined threshold for a predetermined period of time (e.g., approximately 2.0 seconds).

The controller 14 also monitors the vehicle's brake booster vacuum and determines whether the vacuum is less than a predetermined threshold (e.g., approximately −40 millibar) (at 94). For example, during an unintended acceleration situation, initially the brake booster vacuum is normal. However, as the vehicle continues to accelerate, the driver will likely repeatedly apply the brakes (e.g., "pump the brakes") in an effort to stop the runaway vehicle. On each successive application of the brakes, the vacuum reserve will be depleted, which lowers the brake boost vacuum available and lowers the braking force available on each application. Therefore, if the vehicle's brake booster vacuum drops below the predetermined threshold, unintended acceleration may be occurring. The controller 14 monitors the brake booster vacuum using information from the brake booster vacuum sensor 40 and/or the brake controller 36.

As shown in FIG. 6A, the controller 14 also monitors the vehicle's speed to determine whether there is unintended acceleration (at 96). For example, the controller 14 can determine the vehicle's speed based on information from the wheel speed sensors 44, the brake controller 36, and/or the engine controller 23. The controller 14 uses the received information to determine if the vehicle's speed is greater than a predetermined threshold (e.g., approximately 50 kilometers per hour) and/or has been increasing over a predetermined period of time (e.g., approximately 2.0 seconds).

In some embodiments, the controller 14 also detects unintended acceleration when the vehicle's engine torque indicates that the vehicle is accelerating. However, if the controller 14 obtains this information from the engine controller 23, the controller 14 may discount its value as the engine controller 23 may not correctly indicate a high vehicle speed or high motor torque due to mechanical or software problems. Therefore, although the controller 14 may interpret high master cylinder pressure, low brake boost vacuum, and high vehicle acceleration or torque as a fingerprint for unintended acceleration, the controller 14 may conclude there is unintended acceleration even if the engine controller 23 does not indicate high vehicle speed or engine torque. The controller 14 may also determine vehicle acceleration or torque based on monitored wheel speeds or other operating parameters (e.g., engine camshaft rotation) rather than using a value from the engine controller 23.

After detecting an unintended acceleration situation, the controller 14 initiates one or more corrective actions to correct for the detected unintended acceleration. As shown in FIG. 6B, in one embodiment, the controller 14 initiates corrective action by communicating with other controllers in the vehicle to verify the unintended acceleration situation and/or request operation from vehicle components to counteract the situation. For example, the controller 14 can request additional information or operation from the engine controller 23 to verify that unintended acceleration is occurring (at 100). In some embodiments, the controller 14 requests that the engine controller 23 perform a test, such as a "sanity check" or another type of diagnostic test, to verify that engine parameters support an unintended acceleration condition. The controller 14 can also reset the engine controller 23. For example, the controller 14 can send the engine controller 23 a reset request. The reset request can specify a mode for the engine controller 23 to reset to, such as a "limp home" mode where the engine is operational but only at limited speeds. In some embodiments, if a software bug is causing unintended acceleration, a reset of the engine controller 23 may bring the engine controller 23 back to a state where the engine controller 23 handles unintended acceleration properly and no further action is required of the controller 14. The controller 14 can be configured to verify that the engine controller recovers properly from any requested reset.

The controller 14 can also initiate corrective action by requesting motor torque detection (at 102). For example, the controller 14 can communicate with the engine controller 23 (e.g., via an engine controller interface) and request that the engine controller 23 reduce the engine's torque. The request can be given high priority, which informs the engine controller 23 that unintended acceleration has been detected and the engine controller 23 should reduce engine torque as quickly as possible to return the vehicle to a safe operating condition.

In some situations, the controller 14 initiates corrective action by overriding the engine controller 23 and directly controlling the vehicle's engine (at 104). For example, a safety bus or connection can be provided between the controller 14 and engine components, which allows the controller 14 to directly communicate with and control the vehicle's engine. In one construction, the controller 14 is directly connected to one or more of the engine's fuel injectors, and the controller 14 can use the connection to supply high-side power to the fuel injectors and/or remove power in critical situations. Under the control of the controller 14, the engine components may have limited functionality, such as power, while keeping the vehicle in a drivable condition.

As noted above, the controller 14 can also initiate corrective action by applying HBB functionality to support panic braking (at 106). For example, as described above, low available vacuum boost implies that the engine is operating at an open throttle, which does not supply vacuum for the vacuum booster. The HBB functionality compensates for low vacuum boost operation (e.g., using a pump motor). Also, in some situations, brake pad fade can occur while a driver is attempting to stop a vehicle. The controller 14 uses the HBB functionality to build brake pressure higher than most drivers can manually apply to assist in overpowering a runaway engine motor. This large force causes rapid braking, which generally reduces the possibility of brake pad erosion or fade.

Also, in some embodiments, the controller 14 performs a keep-alive function to keep the vehicle operating even if the driver shuts off the vehicle 10 during a race condition (at 108). By keeping the vehicle operating, the controller 14 can ensure that the vehicle is brought to a safe stop and the unintended acceleration is properly handled (e.g., a reset of the engine controller 23 is issued to correct a software malfunction). Therefore, the controller 14 can override a driver-initiated or other-controller-initiated shut down to keep the vehicle operating while one or more of the above correction techniques are applied.

As shown in FIGS. 4B and 6B, the controller 14 can initiate one or more corrective actions in response to detected unintended acceleration and may combine one or more actions in various orders as needed based on the current situation. Also, regardless of the actions taken, the controller 14 may also provide various warnings, alarms, or status information to the vehicle driver to inform the driver that unintended acceleration has been detected and is being addressed. In some embodiments, the controller 14 initiates corrective action by sending out an alert to other vehicle controllers that a race condition has occurred. The controllers receiving the alert can then initiate various actions, such as those described above with respect to FIGS. 4B and 6B.

The actions initiated by the controller 14 to react to and correct for unintended acceleration can be developed by original equipment manufacturers ("OEMs") and controller 14 suppliers (e.g., ESC suppliers). Therefore, multiple components of a vehicle can efficiently operate together to correct for unintended acceleration. For example, the controller 14 can use the CAN bus 22 and standard communication protocols to communicate with various vehicle components to initiate one or more corrective actions. Also, in some embodiments, the controller 14 has a dedicated input/output communication pin assigned and an associated driver and line monitoring circuitry can be used to detect on/off/disconnect states as a failsafe feature.

Figure 7:
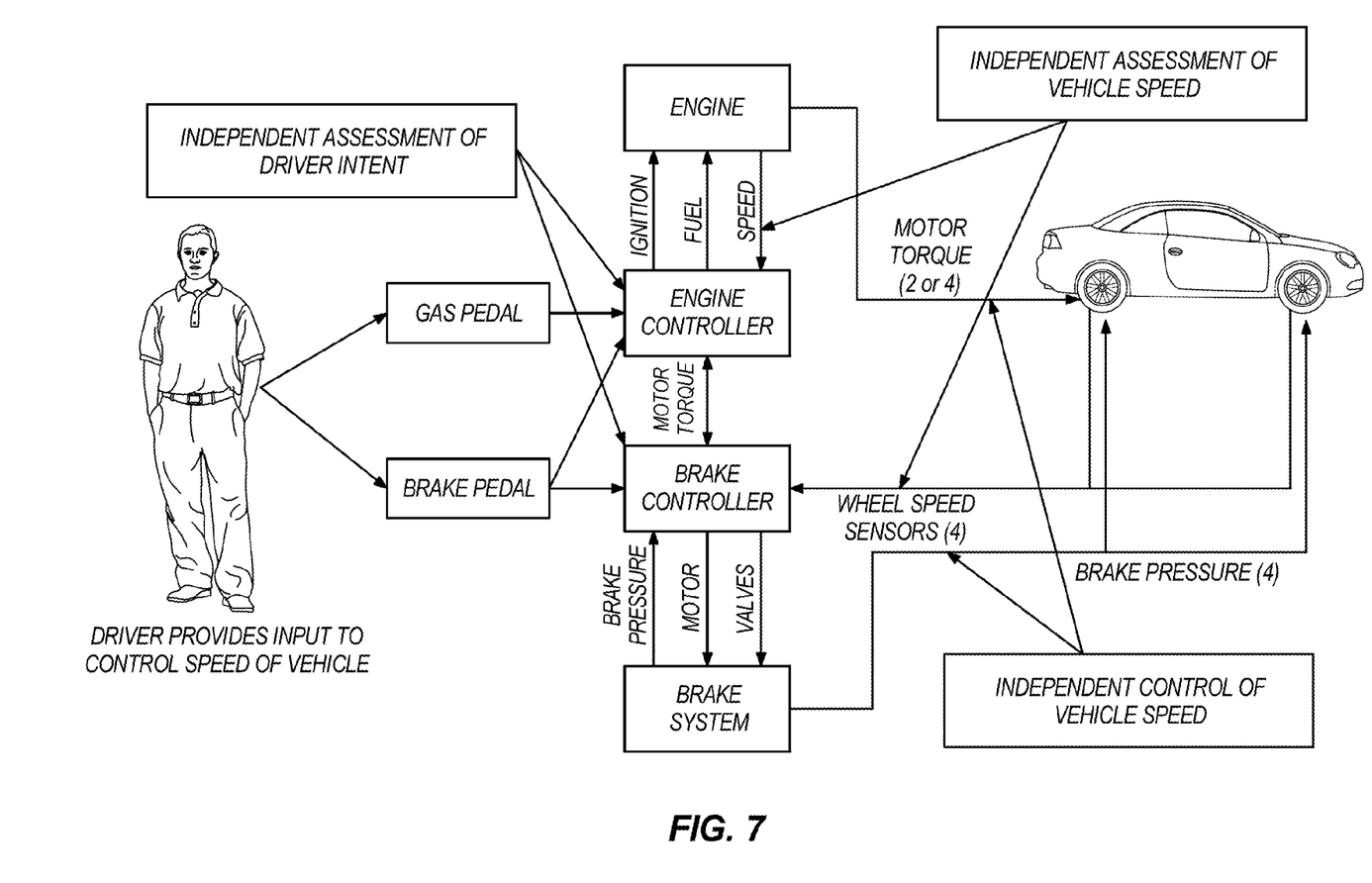
FIG. 7 schematically illustrates the system of FIGS. 2 and 3 including redundant systems and checks.

Furthermore, as described above, the system 12 can use independent and redundant systems and checks for safety reasons. For example, FIG. 7 schematically illustrates the system of FIGS. 2 and 3 including redundant systems and checks. As shown in FIG. 7, the driver has a target speed at which he wants the vehicle to travel. The engine controller and the brake controller make independent assessments of what the driver wants to do. The engine controllers and the brake controller also make independent assessments of what the vehicle is doing including monitoring the vehicle's speed. Therefore, using multiple controllers to make independent assessments, unintended acceleration can be better detected and handled. In addition, as noted above, a controller separate from the engine and brake controllers (e.g., the controller 14) can make independent assessments of driver intent and vehicle operating systems, which provides even greater redundancy and independence. In addition, as noted above, using a separate controller can circumvent any malfunctions or software bugs in the engine or brake controllers.

It should be understood that unintended acceleration situations can occur in internal combustion engine vehicles as well as in hybrid vehicle or full electric vehicles. To detect an unintended acceleration situation in hybrid or electric vehicles, the controller 14 can determine whether the vehicle is traveling forward, backward, or is stationary. In some embodiments, the controller 14 may directly determine this information rather than obtaining this information from an engine controller to ensure that there is not a bug or other malfunction in the engine controller. For example, the controller 14 uses wheel speed sensors to monitor the forward or reverse movement of the vehicle. The controller 14 compares this detected motion with the driver intended motion (e.g., whether the driver is applying the accelerator pedal). Therefore, if the electric motor develops torque without driver intent, the controller 14 can apply the vehicle's brakes to overcome the unintended acceleration and stop the vehicle.

Various features and advantages of the invention are set forth in the following claims.

What is claimed is:

1. A system for detecting unintended acceleration of a vehicle, the system comprising:
   a first sensor providing information on a brake booster vacuum provided by the vehicle's engine to multiply a braking force initiated by a driver;
   a second sensor providing information on the vehicle's speed;
   a third sensor providing information on the braking force requested by the driver; and
   a controller configured to
      receive the information from the first sensor, second sensor, and third sensor;
      detect a race condition when conditions (a), (b), and (c) exist simultaneously:
         (a) the brake booster vacuum is less than a predetermined threshold,
         (b) the vehicle's speed is greater than a predetermined threshold, and
         (c) the braking force initiated by the driver is greater than a predetermined threshold;
      initiate corrective action to counteract the detected race condition; and
      not initiate corrective action to counteract a race condition when not all of the conditions (a), (b), and (c) exist simultaneously.

2. The system of claim 1, wherein the second sensor includes at least one wheel speed sensor.

3. The system of claim 1, wherein the second sensor includes an engine controller.

4. The system of claim 1, wherein the third sensor includes a brake pedal sensor.

5. The system of claim 1, wherein the third sensor includes a master cylinder pressure sensor.

6. The system of claim 1, wherein the third sensor includes a brake controller.

7. The system of claim 1, wherein the controller includes an electronic stability control system.

8. The system of claim 1, wherein the corrective action includes issuing an alarm to the driver.

9. The system of claim 1, wherein the corrective action includes requesting a diagnostic test of the vehicle's engine controller.

10. The system of claim 1, wherein the corrective action includes resetting the vehicle's engine controller.

11. The system of claim 1, wherein the corrective action includes requesting torque reduction from the vehicle's engine controller.

12. The system of claim 1, wherein the corrective action includes overriding the vehicle's engine controller.

13. The system of claim 1, wherein the corrective action includes applying a hydraulic brake boost to the brake booster vacuum.

14. The system of claim 1, wherein the corrective action includes performing a keep-alive function if the driver turns the vehicle's ignition off.

15. The system of claim 1, wherein the corrective action includes automatically initiating an engine shut down procedure.

16. The system of claim 1, wherein the controller is configured to detect a race condition when conditions (a), (b), (c) exist simultaneously for a predetermined period of time.

17. A computer-implemented method for detecting unintended acceleration of a vehicle, the method comprising:
   receiving, by a controller, information on a brake booster vacuum provided by the vehicle's engine to multiply a braking force initiated by a driver,
   receiving, by the controller, information on the vehicle's speed,
   receiving, by the controller, information on the braking force initiated by the driver,
   detecting, by the controller, a race condition when conditions (a), (b), and (c) exist stimultaneously:
      (a) the brake booster vacuum is less than a predetermined threshold,
      (b) the vehicles's speed is greater than a predetermined threshold, and
      (c) the braking force initiated by the driver is greater than a predetermined threshold, and Initiating, by the controller corrective action to counteract the detected race condition and not initiate, by the controller, corrective action to counteract a race condition when not all of conditions (a), (b), and (c) exist simultaneously.

18. The method of claim 17, wherein initiating corrective action includes issuing an alarm to the driver.

19. The method of claim 17, wherein initiating corrective action includes requesting a diagnostic test of the vehicle's engine controller.

20. The method of claim 17, wherein initiating corrective action includes resetting the vehicle's engine controller.

21. The method of claim 17, wherein initiating corrective action includes requesting torque reduction through the vehicle's engine controller.

22. The method of claim 17, wherein initiating corrective action includes overriding the vehicle's engine controller.

23. The method of claim 17, wherein initiating corrective action includes applying a hydraulic brake boost to the brake booster vacuum.

24. The method of claim 17, wherein initiating corrective action includes performing a keep-alive function if the driver turns the vehicle's ignition off.

25. Non-transitory computer-readable medium including executable instructions for detecting unintended acceleration of a vehicle, the medium comprising instructions for:

receiving information on a brake booster vacuum provided by the vehicle's engine to multiply a braking force initiated by a driver;

receiving information on the vehicle's speed;

receiving information on the braking force initiated by the driver; and detecting a race condition when conditions (a), (b), (c) exist simultaneously:
   (a) the brake booster vacuum is less than a predetermined threshold,
   (b) the vehicle's speed is greater than a predetermined threshold, and
   (c) the braking force initiated by the driver is greater than a predetermined threshold;

initiating corrective action to counteract the detected race condition; and not initiating corrective action to counter a race condition when not all of conditions (a), (b), and (c) exist stimultaneously.

* * * * *